United States Patent
Dietl et al.

(10) Patent No.: US 7,620,890 B2
(45) Date of Patent: Nov. 17, 2009

(54) PRESENTING USER INTERFACE ELEMENTS TO A SCREEN READER USING PLACEHOLDERS

(75) Inventors: Josef Dietl, Nussioch (DE); Andreas Rössler, Sutzfeld (DE)

(73) Assignee: SAP AG, Walldorf (DE)

( * ) Notice: Subject to any disclaimer, the term of this patent is extended or adjusted under 35 U.S.C. 154(b) by 51 days.

(21) Appl. No.: 11/027,012

(22) Filed: Dec. 30, 2004

(65) Prior Publication Data

US 2006/0150075 A1    Jul. 6, 2006

(51) Int. Cl.
*G06F 17/00* (2006.01)

(52) U.S. Cl. .............. 715/234; 715/273; 715/760; 715/767; 715/802

(58) Field of Classification Search .......... 715/513, 715/526, 760, 767, 802, 234, 273
See application file for complete search history.

(56) References Cited

U.S. PATENT DOCUMENTS

| | | | |
|---|---|---|---|
| 6,085,120 A * | 7/2000 | Schwerdtfeger et al. ....... 700/90 |
| 6,144,377 A | 11/2000 | Oppermann et al. | |
| 6,654,038 B1 * | 11/2003 | Gajewska et al. .......... 715/802 |
| 6,697,781 B1 * | 2/2004 | Sahlberg .................. 704/260 |
| 6,993,336 B2 | 1/2006 | Aerrabotu et al. | |
| 6,993,707 B2 | 1/2006 | Baker et al. | |
| 7,020,841 B2 | 3/2006 | Dantzig et al. | |
| 7,036,080 B1 | 4/2006 | James et al. | |
| 7,054,818 B2 | 5/2006 | Sharma et al. | |
| 7,116,765 B2 | 10/2006 | Summers et al. | |
| 7,228,495 B2 | 6/2007 | Adapathya et al. | |
| 7,370,286 B2 * | 5/2008 | Etgen .................... 715/833 |
| 7,433,979 B2 * | 10/2008 | Need ...................... 710/33 |
| 2002/0178007 A1 * | 11/2002 | Slotznick et al. ......... 704/270.1 |
| 2002/0198720 A1 | 12/2002 | Takagi et al. | |
| 2003/0068088 A1 * | 4/2003 | Janakiraman et al. ....... 382/229 |
| 2004/0070612 A1 * | 4/2004 | Sinclair et al. ............ 345/762 |
| 2004/0139370 A1 * | 7/2004 | Bailey et al. ............... 714/38 |
| 2004/0261032 A1 * | 12/2004 | Olander et al. ............. 715/747 |
| 2005/0015780 A1 * | 1/2005 | McKeon et al. ............ 719/328 |
| 2005/0034063 A1 | 2/2005 | Baker et al. | |
| 2005/0041858 A1 | 2/2005 | Celi et al. | |
| 2005/0102636 A1 * | 5/2005 | McKeon et al. ............ 715/854 |
| 2005/0102684 A1 * | 5/2005 | McKeon ................... 719/328 |
| 2005/0120308 A1 * | 6/2005 | Gibson et al. ............. 715/779 |

(Continued)

OTHER PUBLICATIONS

Barnicle, Kitch, "Usability testing with screen reading technology in a Windows environment", Published 2000, ACM Conference on Universal Usability, pp. 102-109.*

(Continued)

*Primary Examiner*—Rachna S Desai
(74) *Attorney, Agent, or Firm*—Finnegan, Henderson, Farabow, Garrett & Dunner L.L.P.

(57) ABSTRACT

Methods and apparatus, including computer program products, for providing information to a screen reader. A method includes the actions of receiving information for representing a web page in a browser; setting focus initially on an element of the web page and presenting the web page to a user; and in response to a user command directing the focus to consecutive target elements of the web page, assigning information related to each target element to a placeholder control and providing a screen reader with access to the placeholder control as the element having focus.

16 Claims, 3 Drawing Sheets

U.S. PATENT DOCUMENTS

| | | | |
|---|---|---|---|
| 2005/0164153 A1* | 7/2005 | Beatty et al. | 434/350 |
| 2005/0246283 A1 | 11/2005 | Gwiazda et al. | |
| 2005/0246653 A1* | 11/2005 | Gibson et al. | 715/773 |
| 2005/0278475 A1* | 12/2005 | Karatal et al. | 711/100 |
| 2005/0278728 A1* | 12/2005 | Klementiev | 719/328 |
| 2006/0063138 A1 | 3/2006 | Loff et al. | |
| 2006/0090138 A1* | 4/2006 | Wang et al. | 715/760 |
| 2006/0150084 A1 | 7/2006 | Dietl et al. | |
| 2006/0150110 A1 | 7/2006 | Dietl et al. | |
| 2007/0198945 A1 | 8/2007 | Sun et al. | |

OTHER PUBLICATIONS

Parente, Peter, "Audio enriched links: web page previews for blind users", Published 2003, ACM SIGACCESS Conference on Assistive Technologies, pp. 2-8.*

Anwar, Mohd, et al., "Nonvisual Tool for Navigating Hierarchical Structures", Assets'04, Oct. 18-20, 2004, pp. 133-139.*

AT Journal, "Apple Adds Spoken Interface to Mac Operating System", vol. 94, Apr. 1, 2004, pp. 1-3, Available Online on the World Wide Web at: http://www.atnet.org/news/2004/apr04/040101.htm.*

Microsoft Corporation, "Microsoft Active Accessibility Version 2.0", Copyright 1997-2001, pp. 1-225.*

* cited by examiner

| Page element | Entry point ID |

- 410 Compile a page including audible and visible data by server
- 420 Client receives the page data
- 430 HTML-compliant code generated from page data
- 440 Input information generated from page data for placeholder manager

PRESENTING USER INTERFACE ELEMENTS TO A SCREEN READER USING PLACEHOLDERS

BACKGROUND

The present invention generally relates to digital data processing and more particularly to presenting controls of web pages to screen readers in a reliable way.

Screen readers are software programs that present graphics and text as speech. For a computer user who is blind or otherwise visually impaired, and therefore cannot read information from a visual display device, e.g., a computer monitor, a screen reader is used to provide information in a non-visual form to a user about what appears on the screen, which will generally include names and descriptions of control buttons, menus, text, and punctuation. In essence, a screen reader transforms a graphical user interface (GUI) into an audio or other non-visual interface. Screen readers can also be used in other circumstances, for example, in industrial workplaces by operators whose eyes are busy with tasks other than watching a computer display.

Many computer-implemented applications display information on a computer screen using a web browser based interface. Such applications can be sites of web pages served over the Internet or client-server based systems such as an enterprise resource planning (ERP) system. Business processes within enterprises are often controlled using computer-implemented systems such as ERP systems. An example of an ERP system is the integrated business solution made by SAP AG of Walldorf (Baden) Germany. Within such a system a number of business processes can be controlled, for example, human resources, finance, controlling, purchases, sales, production, and planning. Implementations of business processes usually involve workflows, i.e., sequences of generally sequential steps for completing a specific business process. Typical implementations use a web-based client-server architecture, with client-side graphical user interfaces. Vision-impaired users rely on screen readers to interact with the graphical user interfaces.

SUMMARY OF THE INVENTION

The present invention provides methods and apparatus, including computer program products, that implement techniques for providing information to a screen reader.

In general, in one aspect, the invention features corresponding methods and apparatus for providing information to a screen reader. A method includes receiving information for representing a web page in a browser; setting focus initially on an element of the web page and presenting the web page to a user; and in response to a user command directing the focus to consecutive target elements of the web page, assigning information related to each target element to a placeholder control and providing a screen reader with access to the placeholder control as the element having focus. The method can be implemented to include one or more of the following advantageous features. Focus is selectively transferred from the target element to the placeholder control according to the target element and from the placeholder control to a next target element in response to a next navigation step by the user. The placeholder control is one of a pair of a first placeholder control and a second placeholder control used alternately. The user command is generated using a keyboard. The web page is presented in a web browser. The placeholder control is visually represented by the web browser.

In general, in another aspect, the invention features corresponding methods and apparatus for providing information to a screen reader. A method includes receiving at a client side information for representing a web page in a browser; setting focus initially on an element of the web page and presenting the web page to a user; and in response to a user command directing the focus to an element of the web page, determining whether the element is present in a functionality map, and if so, looking up the element in the functionality map, then processing the element as indicated by a corresponding entry point in the map, and if not, providing the focus and information related to web page elements associated with the focus to a placeholder control, and providing a screen reader with access to the placeholder control. The method can be implemented to include one or more of the following advantageous features. The functionality map is a functionality table. The screen reader is identified, and based on the identity of the screen reader, a functionality map from a set of functionality maps is selected. The method includes locating multiple screen readers on the client side, and selecting one of the screen readers for use. The selection is done based on the number of entries in a respective functionality map for the screen reader.

In general, in another aspect, the invention features corresponding methods and apparatus for providing information to a screen reader. A method includes receiving web page information that includes data to be presented, visual order data relating to the data to be presented, and audible order data relating to the data to be presented; compiling, based on the received web page information, a web page representation to be interpreted by a web browser; and compiling, based on the received web page information, a web page representation to be interpreted for presentation to an assistive application. The method can be implemented to include one or more of the following advantageous features. The audible order information includes a tab or keyboard sequence. The tab or keyboard sequence uniquely defines navigation paths between page elements. The visual order data includes page structure data. The visual order data is represented in a hierarchical data structure. The audible order information includes a tab or keyboard sequence. The tab or keyboard sequence uniquely defines navigation paths between page elements.

The invention can be implemented to realize one or more of the following advantages. Good keyboard accessibility of the various user interface controls on a browser screen is provided. Good accessibility of a computer system to a vision-impaired user is provided. By providing within a client-side framework a placeholder control interface with which the screen reader communicates, the information presented to the screen reader (and consequently through the screen reader to the user) through the control interface is unambiguously defined. Native tools can be used, resulting in efficient use of computing resources. The navigation commands given by the user through the interface are clear and efficient, so that a user can use the client-side interface in combination with a screen reader in an efficient manner.

Details of implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
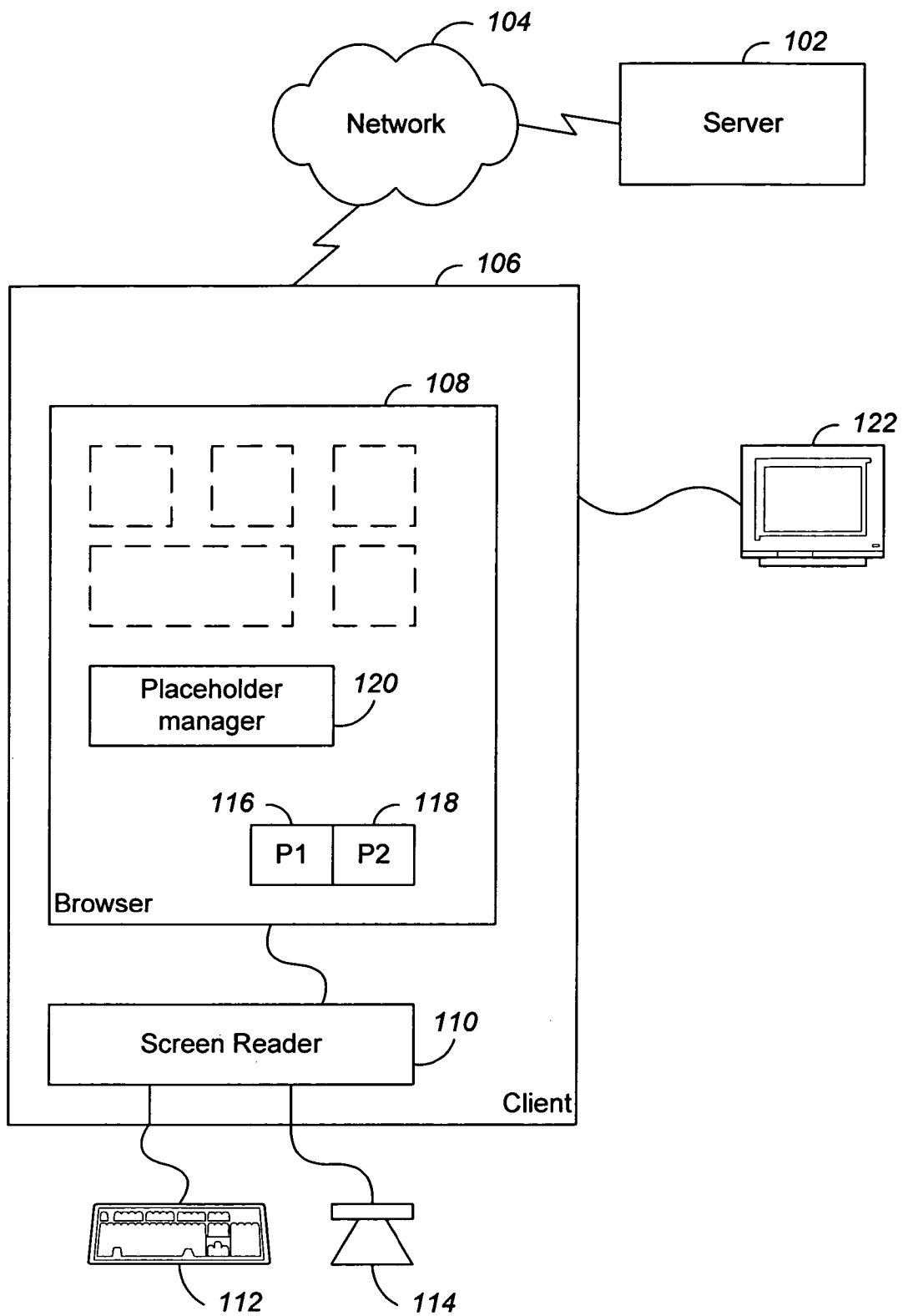
FIG. 1 is a schematic diagram of an implementation of the invention.

FIG. 1 illustrates an example implementation of the invention. A server 102 is running an application, for example a business application, that is accessed by a user using a client 106 over a network 104. The client 106 has a keyboard 112 or other input device for receiving user commands, as well as a loudspeaker 114 for outputting audio information or other output device for outputting non-visual information, e.g., tactile information. The network 104 can be any kind of communication network, including a local area network or a wide area network. Generally, the client 106 will also have a visual display device 122.

Typically, clients run web browsers to access web-based applications. Web-based applications are applications that interact with client devices through protocols of the World Wide Web and present themselves to users in the form of web pages. A web page is composed of components or elements, many of which can include further components or elements. When running such an application, the server 102 sends web pages to the client web browser 108. Web browsers exist that run on a wide range of client devices, including personal computers, personal digital assistants, and cell phones. For brevity, web pages and web browsers will be referred to simply as pages and browsers.

In use, the client 106 runs a browser 108 and a screen reader 110. Any screen reader can be used that can obtain web display and status information from a browser. A variety of screen readers are commercially available. A page typically includes content (layout and data) that defines a graphical user interface of an application. A page typically is rendered on the server into, and is received by the browser in, a browser-compatible format, such as HTML (Hypertext Markup Language) or WML (Wireless Markup Language), or in a format that can be converted to such a browser-compatible format by code running on the client.

The functionality of the browser is extended, as compared to the normal functionality of displaying pages, by providing the browser with program code parts that can be executed by the browser to perform the client-side operations described in this specification. Such code parts can be written in a scripting language, e.g., ECMAScript or VBScript. The program code parts can be part of a client-side framework implemented in script classes. The server can send these program code parts as browser-compatible instructions to the client to provide a client-side framework. The program code parts can be provided to the client using any suitable method, and can, for example, be installed in the client, or downloaded from a server. For convenience, the program code parts will be referred to collectively as a "placeholder manager", which is illustrated as placeholder manager 120 in FIG. 1.

In computer applications that use a graphical user interface, generally one user interface element has focus. If the user interface element with focus is an input element, input actions (for example, pressing keys on a keyboard) will be directed to that element. With a user interface input element, a visual indicator is generally used (such as, for example; a system caret, cursor or insertion point, or highlighting) to indicate visually that the element has focus. The focus indicator is generally moved as the input focus changes as a result, for example, of a user navigating by pressing the tab key. When the screen reader 110 is active, it obtains information about the element that has focus and provides the information to the user.

Figure 2:
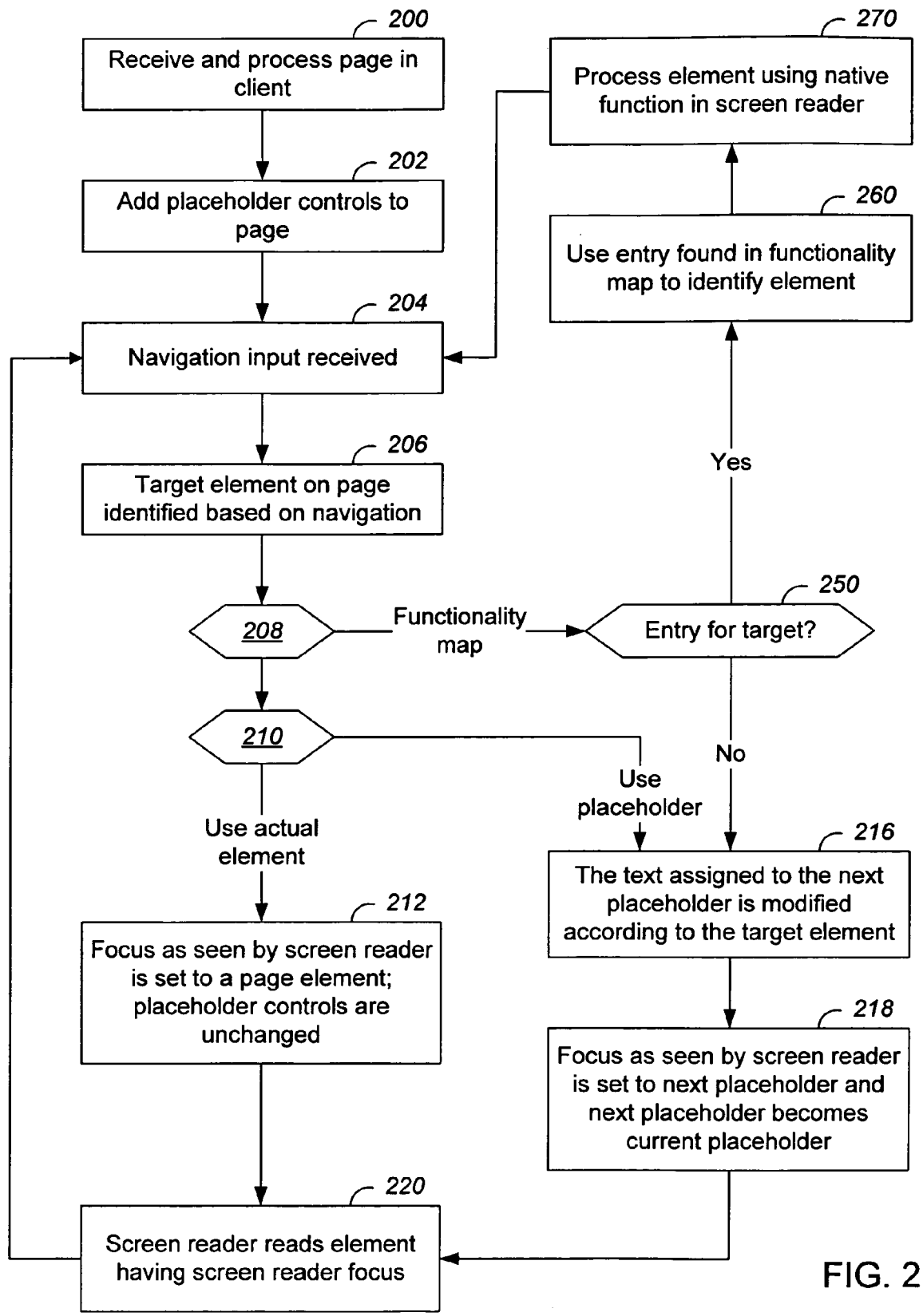
FIG. 2 is a flowchart of a method that uses placeholder controls to support a screen reader.

As shown in FIG. 2, when a page is received in a client it is processed (step 200). In one implementation, the markup language portions of the page are processed and the page is made available for manipulation and processing through Document Object Model (DOM) interfaces. DOM APIs (application programming interfaces) are defined by specifications provided by the World Wide Web Consortium (W3C). The DOM (e.g., HTML DOM) represents documents as a hierarchy of nodes, which can be referred to as the DOM tree. Using the DOM API, script code running in a browser can access and manipulate a parsed HTML or XML document. In the present example implementation, a DOM tree represents the user interface elements of a page received in the browser. The user interface elements are rendered by the browser, and the audible information is rendered for the placeholder controls, which will now be described.

A first placeholder control 116 ("P1") and a second placeholder control 118 ("P2") are added to the displayed page (step 202). They can be added on the server side or on the client side. The placeholder controls 116, 118 support both programmatic assignment of focus and presentation of their content to a screen reader. In one implementation, they are generated on the client side by a client-side framework or client-side program code, which framework or code is generically being referred to as the placeholder manager. The placeholder controls can be made visible or invisible on the screen. As will be described, focus as seen by the screen reader for presentation to the user is generally assigned to one of the placeholder controls. The placeholder controls can optionally be defined on a virtual page. The placeholders are initialized so that there is a current and a next placeholder control for use as the user navigates on the page.

A user interface element on the page gets the focus (step 204). Initially, when a page is loaded, an element that is the starting point of navigation on the page gets the focus. To distinguish the element on the page that has focus, it may be referred to as the target element. The initial target element, like all target elements, has a corresponding to a position within the DOM tree. Information about the target element can be retrieved using DOM calls on the page.

As the user navigates through the page, using the tab keys of the keyboard, for example, in forward or backward direction, the focus moves among the user interface elements on the page, e.g., from one form field to a next form field, or from element to element inside a table. Navigation is not limited to tab key or even keyboard input; any method of navigation and input device can be used by the user.

In one implementation, the placeholder manager receives all navigation input and programmatically sets focus on actual page elements or on placeholder controls, bypassing that aspect of the operation of the browser, and maintaining its own model of the user's focus on the page. This behavior can be hard coded, or it can be controlled, at least in part, by data of the kind that will described in reference to FIGS. 3 and 4.

When a navigation input is received (step 204), or when focus is first established, the placeholder manager identifies the next target element on the page (step 206), i.e., the element that will next have focus. This is done based on the input received and the then-current state of the page.

Each placeholder control can have text assigned to it. The placeholder manager assigns text to a next placeholder control (e.g., P2) according information obtained about the target element (step 216), and then sets the focus as seen by the screen reader from the current placeholder control (e.g., P1) to the next placeholder control (e.g., P2), which becomes the current placeholder control (step 218). In one implementation, the focus seen by the screen reader is the browser focus, so that no reprogramming of the accessibility interface of the browser is required. The screen reader is programmatically notified of the change of focus, e.g., through a listener registered by the screen reader with the browser, and the screen reader reads the newly assigned text with each focus switch (step 220), thereby informing the user about the target user interface element.

For each navigation step, the roles of the placeholder controls are reversed and the screen reader reads the newly assigned text, as described above. More than two placeholder controls can be used, in which case the order of switching can be made in a chain or a loop pattern.

In an implementation in which the browser focus is the focus for the screen reader, user input to a page element must be dealt with. One alternative is to have the placeholder controls receive the input from the user and programmatically provide it to the elements on the page. Generally more convenient, however, is for the placeholder manager to set focus to an actual input element on the page to receive user input when the user has navigated to an input field, especially as screen readers usually have special functions for handling common input elements. In this alternative, either a placeholder control is given focus ("Use placeholder" branch from decision step 210 to step 216), or focus is given to an actual element on the page ("Use actual element" branch from decision step 210 to step 212), in which case the placeholder manager sets focus to an element on the page and the status of the placeholder controls is unchanged (step 212). The screen reader, upon detecting the change of focus, reads the element having focus (step 220).

Figures 3, 4:
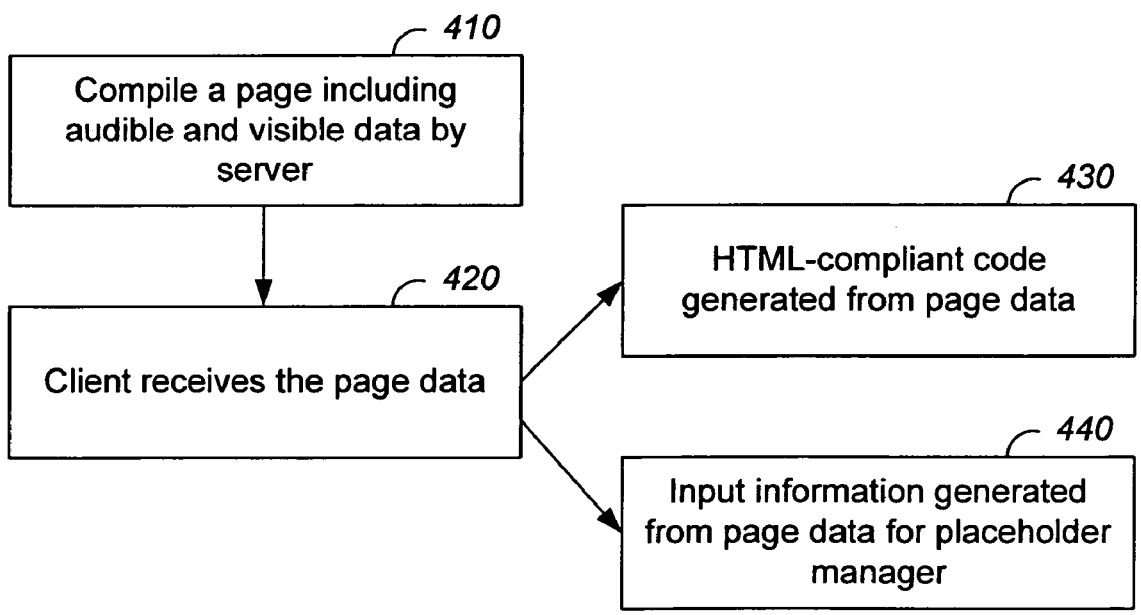
FIG. 3 illustrates a functionality table used in one implementation of the invention.
FIG. 4 illustrates a method used in one implementation of the invention.

As a further option, a functionality map, described below in reference to FIG. 3, can be used to identify page elements for which an actual page element rather than a placeholder control gets focus and is therefore read by the screen reader. This is illustrated in FIG. 2 as an additional decision step (step 208); however, this can be implemented instead of steps 210 and 212.

Screen readers typically have special functions for processing particular HTML elements, notably elements of the type <input type="text" . . . >, to give them special treatment. A functionality table 300 (FIG. 3) is used to allow the special functions of a screen reader to be used for particular controls and, optionally, to select a screen reader to use. The functionality table 300 has entries matching page elements 310 with entry point identifiers (IDs) 320 that identify the elements that the screen reader should use in making a particular page element accessible. The entry points can be expressed, for example, by HTML id attributes or by a naming conventions for such identifiers. The functionality table 300 can have one or more element entries 310; for a single entry 310, one or more entry point IDs 320 can be listed. Optionally, a reserved entry can be used to indicate that the use of a placeholder control is to be bypassed for the corresponding target entry (i.e., that the actions of step 212 rather than the actions of steps 216, 218 are performed). Other data structures, e.g., dictionary structures or list structures, can be used instead of a table structure. Generically, such data structures will be referred to as "functionality maps".

A functionality map can be specific to a single type of screen reader, listing the specific functions for that screen reader type. A functionality map can be identified by one or more identifying characteristics, e.g., screen reader name and version number.

In one implementation, client code identifies the screen reader in use on the client system and selects a functionality map that corresponds to the screen reader in use. Optionally, a lookup table or list is provided that lists each available functionality map so that the appropriate functionality map can be used at run time.

In an alternative implementation, client code scans the client system for screen readers and selects one of them. The selected screen reader is then activated. The selection can be based on the presence of a functionality map for the screen reader and/or on the extent of the functions in the functionality maps when multiple maps are present, in which case a screen reader with more available functions can be selected.

As shown in FIG. 2, if there is a functionality map ("Functionality map" branch from decision step 208) and the target element is found in the functionality map ("yes" branch from step 250), the native element, i.e., an HTML element associated with the page element by the functionality map, is used to represent the page element to the screen reader (step 260). This representative is processed by the native functionality of the screen reader (step 270). On the next navigation command of the user, the process resumes at step 204.

If the page element is not found in the functionality map ("no" branch from step 250), the process continues at step 216.

In an implementation that does not support functionality maps at all, the operations specific to them (steps 208, 250, 260, 270) would, of course, be omitted.

As will now be described in reference to FIG. 4, the pages received in the client can optionally include presentation data for presentation by a user interface, visual order data defining an order for visual navigation, and audible order data defining an order for audible (or otherwise assisted) navigation. This data can be compiled by the server (step 410). The visual order information includes the structure of the page, and can, for example, be represented in a hierarchical data structure, for example, an HTML tree structure. The audible order information includes a tab or keyboard sequence, by which of the paths between page elements based on tab or keyboard navigation are uniquely defined.

A page can be represented as a list of objects. In a pseudo code form, an example of such a list is:

```
[
    {type="text", name="field2"},
    {type="text", name="field3"},
    {type="submit", name="submit"}
]
``` where the square brackets delimit the list, and the braces denote the elements within the same structure. In this implementation, both the tab or keyboard navigation order and the visual navigation order are implicitly defined in the list definition.

In an alternative implementation, the page is represented in a hierarchical structure, such as for example a tree, or any other suitable ordered data structure, and the tab or keyboard navigation order is explicitly defined. In a pseudo code form, an example of such a tree is:

```
{ type="group", name="g1", next="f2", previous="submit", content={
    {type="text", name="f2", next="f3", previous="g1"},
    {type="text", name="f3", next="g2", previous="f2"},
    { type="group", name="g2", next="f5", previous="f3", content={
        {type="text", name="f5", next="o", previous="g2"},
        {type="output", content="Hello World", next="b", previous="f5"}
    },
    {type="submit", name="b", next="g1", previous="g2"}
  }
}
``` where the next and previous attributes relate to navigation between the elements of the page. These attributes can be given effect by the placeholder manager, as described above.

After receipt of the page data by the client (step 420), HTML-compliant code can be generated from it (step 430), as well as input information that a client-side framework can use to distribute to the placeholder manager (step 440). By compiling page representations for interpretation by the browser and the placeholder manager (and therefore the screen reader) based on the same received page information, consistency is guaranteed between (i) the markup as parsed and shown by the web browser, and (ii) the audible output of the screen reader of data obtained from the placeholder manager. Advantageously, the dynamic modification of page information, for example, by changing the source information or a program internal data structure, triggers regeneration of the page and thus always yields consistency between the visual and audible output from the browser and screen reader. After compilation, the browser-compliant code is transferred to the browser, and the screen reader data is transferred to the placeholder manager and processed as described above.

As mentioned earlier, the functionality of a conventional browser can be enhanced by a client-side framework implemented in a scripting language. One such framework is described in commonly-owned U.S. Patent Publication No. US-2003-0172197-A1 for a "JavaScript Client Framework" to Dencker et al. The techniques described in this specification for providing information to a screen reader can be implemented in this client-framework ("CSF"). One implementation will now briefly be described.

In the CSF, every displayed control has a corresponding JavaScript class instance that contains the functionality of the specific control. For example, an InputField instance can check whether a character entered by the user is valid for a corresponding InputField control, or a TabStrip instance can change the visualization when the user selects a different tab in a TabStrip control.

Every specific control has a representation as an HTML DOM subtree. Thus, there a two trees: (1) the UI tree (user interface tree) of the screen represented by instances of corresponding JavaScript classes, and (2) the resulting HTML DOM tree, which is a rendering that determines the actual visualization in the browser. In the CSF, every user interface element is an instance of the abstract base class UIElement. The UI tree will consist of (1) UIElements that are container elements and can contain other UIElements (e.g. Group, Tray, TabStrip), and (2) simple UIElements (e.g. Image, TextView, InputField), which cannot contain any further UIElements.

The order and structure of the UI tree implicitly specifies the order of the tab chain. From this information, the CSF knows which UIElement is to receive focus when the user presses the tab key. In addition, every UIElement knows what information is to be read by the screen reader when a particular UIElement event occurs. This is coded in the implementation of the UIElement JavaScript class.

For example, focus can move to an InputField control. The implementation of the InputField specifies that specific text should be read, according to the properties of the specific control, e.g., "InputField 'Number of items to order'—Enter a positive Integer. Press F2 to get detailed information". An event other than an on focus event can also result in information being made available for reading. For example, when the user scrolls in a table control, only the new displayed lines have to be read, and the implementation of the corresponding table JavaScript class so specifies.

The CSF uses the information specifying the tab chain and the text that should be read by the screen reader when a user interaction occurs to provide information for a screen reader using techniques described in greater detail above. Using two placeholders, the CSF (1) sets the text to the placeholder that does not have focus when the interaction occurs, and (2) sets the focus to that placeholder; as a consequence of which, (3) the screen reader reads the text; and then (4) if more text is to be read, the CSF continues with action (1). As also described in greater detail above, for particular data entry controls that are handled as exceptions, or for any other controls that are handled as exceptions, the CSF gives focus to the control itself, rather than to a placeholder, to facilitate the handling of data entered by the user, for example, or to exploit particular screen reader functionality.

In an implementation with such a client-side framework, a placeholder manager only needs to get the text and the information about which HTML element has to be handled from the framework. Having that, the placeholder manager can use the placeholders or handle the exceptions as described above. The framework could be the CSF or it could be a different framework that gets the information out of a functionality table. It is advantageous that the framework maintain the text content and tab chain information separately from the actions of the placeholder manager.

Advantageously, the techniques described in this specification can be implemented without relying on a hard programmed interpretation of static HTML code or the like, and they can be used effectively with applications where the user interface can be highly personalized and/or customized, as is often the case with standard business software applications.

These techniques can also be used to provide assisted access to web pages that do not necessarily originate from a server application; for example, they can be used with web pages generated on a stand-alone computer system.

These techniques can be used with assistive applications that facilitate access to computer systems other than screen readers, such as, for example, screen magnifiers. In particular, these techniques can be used with assistive applications that require the transformation of visual or screen information into other forms of information transportation, such as sound, touch, or motion.

Finally, these techniques can be used with a large variety of information processing platforms, because they can be implemented with no special or additional functionality, such as for example Java applets or ActiveX components, in the browser. However, these techniques can be implemented using such components.

Aspects of the invention and all of the functional operations described in this specification can be implemented in digital electronic circuitry, or in computer software, firmware, or hardware, including the structural means disclosed in this specification and structural equivalents thereof, or in combinations of them. Implementations of the invention can be made as one or more computer program products, i.e., one or more computer programs tangibly embodied in a machine-readable storage device, for execution by, or to control the operation of, data processing apparatus, e.g., a programmable processor, a computer, or multiple processors or computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. A computer can be embedded in another device, e.g., in a digital appliance, for example, a mobile telephone or a personal digital assistant, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, output provided to the user can be in any sensory form, e.g., visual, auditory, or tactile output; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations, but other implementations are within the scope of the following claims. For example, the operations recited in the claims can be performed in a different order or in parallel and still achieve desirable results. Other implementations are within the scope of the following claims.

What is claimed is:

1. A computer-implemented method for providing information to a screen reader comprising:
    receiving information on a computer for representing a web page in a browser;
    presenting the web page on the computer;
    receiving a first input command on the computer requesting focus on a target element of the web page;
    determining, on the computer, whether the target element is a user input field in advance of assigning focus to the target element or a placeholder control corresponding to the target element;
    assigning focus to the target element when the target element is determined to be a user input field;
    assigning focus to one of a pair of placeholder controls when the target element is not a user input field, the placeholder controls receiving focus in an alternating fashion in response to subsequent input commands;
    providing a first screen reader, on a computer, with content specific to the identified placeholder control or the target element.

2. The method of claim 1, further comprising:
    in response to a subsequent input command, selectively transferring focus from the identified placeholder control or target element to a next target element.

3. The method of claim 1, wherein the user command is generated using a keyboard.

4. The method of claim 1, wherein the web page is presented in a web browser.

5. The method of claim 4, wherein the placeholder control is visually represented by the web browser.

6. The computer-implemented method according to claim 1, further comprising:
    scanning a system for a plurality of screen readers;
    selecting the first screen reader from the plurality of screen readers;
    activating the first screen reader before providing the content to the first screen reader.

7. A computer program product, tangibly embodied on a machine-readable storage device, operable to cause a data process apparatus to perform the operations of:
    receiving information for representing a web page in a browser;
    presenting the web page;
    receiving a first input command requesting focus on a target element of the web page;

determining whether the target element is a user input field in advance of assigning focus to the target element or a placeholder control corresponding to the target element;

assigning focus to the target element when the target element is determined to be a user input field;

assigning focus to one of a pair of placeholder controls when the target element is not a user input field, the placeholder controls receiving focus in an alternating fashion in response to subsequent input commands;

providing a first screen reader with content specific to the identified placeholder control or the target element.

8. The product of claim 7, further operable to cause the data process apparatus to perform the operation of:

in response to a subsequent input command, selectively transferring focus from the identified placeholder control or target element to a next target element.

9. The product of claim 7, wherein the user command is generated using a keyboard.

10. The product of claim 7, wherein the web page is presented in a web browser.

11. The product of claim 10, wherein the placeholder control is visually represented by the web browser.

12. A system comprising:

a processor;

a memory with a computer program stored thereon for:

receiving information for representing a web page in a browser;

presenting the web page;

receiving a first input command requesting focus on a target element of the web page;

determining whether the target element is a user input field in advance of assigning focus to the target element or a placeholder control corresponding to the target element;

assigning focus to the target element when the target element is determined to be a user input field:

assigning focus to one of a pair of placeholder controls when the target element is not a user input field, the placeholder controls receiving focus in an alternating fashion in response to subsequent input commands;

providing a first screen reader with content specific to the identified placeholder control or the target element.

13. The system of claim 12, the computer program being further configured to:

selectively transfer focus from the identified placeholder control or target element to a next target element in response to a subsequent input command.

14. The system of claim 13, wherein the system comprises a keyboard and the user command is generated using the keyboard.

15. The system of claim 12, wherein the web page is presented in a web browser.

16. The system of claim 15, wherein the placeholder control is visually represented by the web browser.

* * * * *